United States Patent [19]
In

[11] Patent Number: 5,821,194
[45] Date of Patent: Oct. 13, 1998

[54] CATALYST FOR PURIFYING THE EXHAUST GAS OF VEHICLES

[75] Inventor: Chi-Bum In, Puch'On, Rep. of Korea

[73] Assignee: Kia Motors Corporation, Seoul, Rep. of Korea

[21] Appl. No.: 732,101

[22] Filed: Oct. 15, 1996

[30] Foreign Application Priority Data

Aug. 27, 1996 [KR] Rep. of Korea ................. 96-35906

[51] Int. Cl.$^6$ ...................................................... B01J 21/04

[52] U.S. Cl. ............................................ 502/439; 502/527

[58] Field of Search ........................... 472/150; 502/439, 502/527; 252/477

[56] References Cited

U.S. PATENT DOCUMENTS 5,094,074  3/1992  Nishizawa et al. ..................... 502/527
5,599,509  2/1997  Toyao et al. ............................ 502/527

*Primary Examiner*—Wayne Langel
*Assistant Examiner*—Tanaga Anne Boozer

[57] ABSTRACT

A catalyst for purifying the exhaust gas of vehicles having a metallic flat substrate in a scroll form, a metallic corrugated substrate formed in a scroll and engaged with the flat substrate, an intermediate layer of ceramic provided on both surfaces of the flat and the corrugated substrates, and a catalytic layer provided on the intermediate layer. The corrugated substrate and the flat substrates have a plurality of holes which are filled with the intermediate layer of ceramic.

13 Claims, 3 Drawing Sheets

CATALYST FOR PURIFYING THE EXHAUST GAS OF VEHICLES

BACKGROUND OF THE INVENTION

The present invention relates to a catalytic converter for a vehicle and, more particularly, to a catalyst of a catalytic converter installed on an exhaust pipe to reduce poisonous elements of an exhaust gas by oxidizing and reducing harmful elements of the exhaust gas discharged from the engine.

Recently, it has been of great importance to reduce air pollution caused by the exhaust gas of vehicles. The exhaust of a vehicle includes gas exhausted through an exhaust pipe, blowby gas exhausted from the crankcase of the engine, and fuel vaporization gas vaporized from the fuel tank or carburetor.

Of those gases, the exhaust gas is discharged to the outside through the exhaust pipe after a fuel is burnt in the cylinder. Most of the exhaust gas contains harmless materials such as $H_2O$, $N_2$, $CO_2$, but it also contains harmful materials such as CO, HC, NOx. As a conventional method of removing the harmful elements in the exhaust gas, there has been suggested a catalytic converter method in which the exhaust gas discharged from the engine passes through an oxidation and reduction catalytic converter installed on the exhaust pipe of the back of the exhaust manifold.

Such catalytic converter method includes: an oxidation catalytic converter which produces harmless CO, $H_2O$ from the oxidation of CO, HC in the exhaust gas; a reduction catalytic converter which produces harmless $N_2$, $CO_2$ from the reduction of NOx in the exhaust gas; and a 3-way catalytic converter which simultaneously oxidizes and reduces CO, HC, NOx in the exhaust gas with a single catalytic converter.

Such a catalytic converter consists of a metallic housing and a catalyst arranged in the metallic housing, and the catalyst is constructed of a substrate as a base, an ceramic intermediate layer (or wash-coat) coated on the substrate, and a catalytic layer coated on the intermediate layer. For the substrate, a ceramic monolith and a metallic monolith are widely used.

FIGS. 1 and 2 show in detail the construction of the conventional catalyst, and a vertical sectional view of a catalyst in a metallic housing. The metallic substrate using as the base of the catalyst 1 is constructed of a flat substrate 3 and corrugated substrate 5, the flat substrate 3 and corrugated substrate 5 are welded and solder to each other, and then they are rolled in a scroll. Also, a porous ceramic intermediate layer 7 and a catalytic layer 9 are stacked on the surface of the each substrate 3, 5. There is an advantage in that the metallic substrate having the construction mentioned above has less back pressure. Because it is made of a thin plate of only 50–70 mm, compared with a ceramic substrate having a wall thickness of 150–300 mm, there is a decrease in the output loss.

In addition, there is an advantage in that the time attaining to the operation temperature is shortened because of its high heat conductivity. Thus, the purification efficiency of the exhaust gas is increased, and the heat resistance and endurance are improved.

On the other hand, there are problems that the surface area of the metallic substrate is smaller than the ceramic substrate having numerous paths (typical 65 per 1 $cm^2$) through which the exhaust gas passes. Therefore, gas diffusion does not occur between cells, and the adhesion power between intermediate layers of ceramic is very weak due to the difference in materials.

SUMMARY OF THE INVENTION

Accordingly, the present invention is directed to a catalyst for purifying the exhaust gas of vehicles that substantially obviates one or more of the problems due to limitations and disadvantages of the related art.

An object of the present invention is to provide a catalyst provided with a porous metallic substrate which improves the adhesion power between intermediate layers of ceramic, and increases the effective area which the exhaust gas is in contact with, and the diffusion of the exhaust gas.

To achieve these and other advantages and in accordance with the purpose of the present invention, there is provided a catalyst for purifying the exhaust gas of vehicles having a metallic flat substrate in a scroll form, a metallic corrugated substrate formed in a scroll and engaged with the flat substrate, an intermediate layer of ceramic provided on both surfaces of the flat and the corrugated substrates, and a catalytic layer provided on the intermediate layer, wherein the improvement comprises: a plurality of holes formed in the corrugated substrate and the flat substrates and filled with the intermediate layer of ceramic.

Therefore, the surface area of the catalyst is increased by holes, the purification efficiency increases as an exhaust gas is diffused to adjacent cells through the holes, and the intermediate layers of ceramic wash-coated on the surface of the metallic substrate are directly connected thereto so that they are adhered physically and chemically.

BRIEF DESCRIPTION OF THE ATTACHED DRAWINGS

A more complete appreciation of this invention, and many of the attendant advantages thereof, will be readily apparent with reference to the following detailed description when considered in conjunction with the accompanying drawings in which like reference symbols indicate the same or similar components, wherein.

DETAILED DESCRIPTION OF PREFERRED EMBODIMENT

Reference will now be made in detail to the preferred embodiments of the present invention, examples of which are illustrated in the accompanying drawings.

Figure 1:
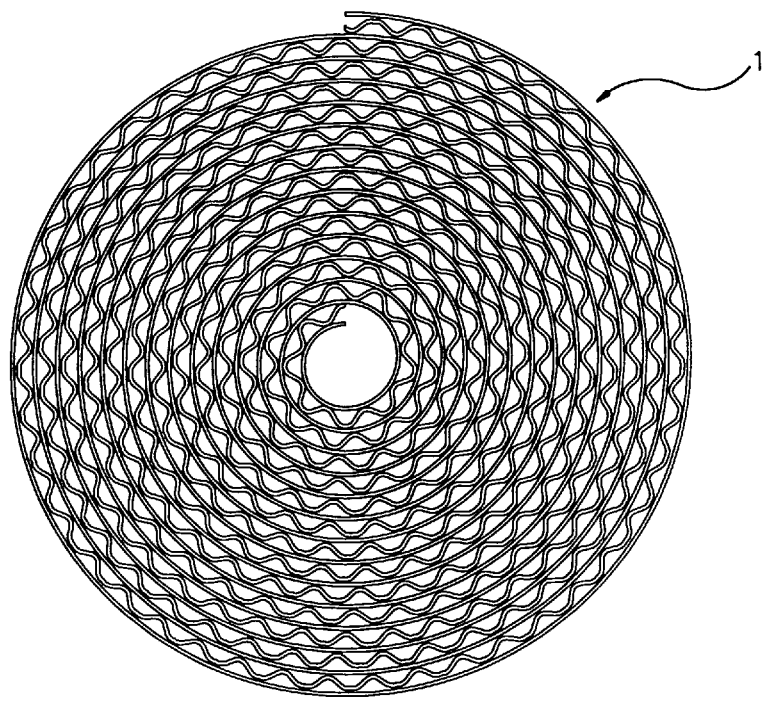
FIG. 1 is a front sectional view showing a prior art catalyst for a general vehicle.
Figure 2:
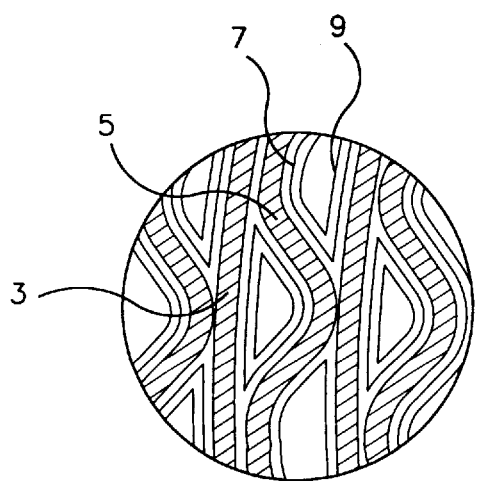
FIG. 2 is a front sectional view which enlarges a part of the catalyst of FIG. 1.
Figure 3:
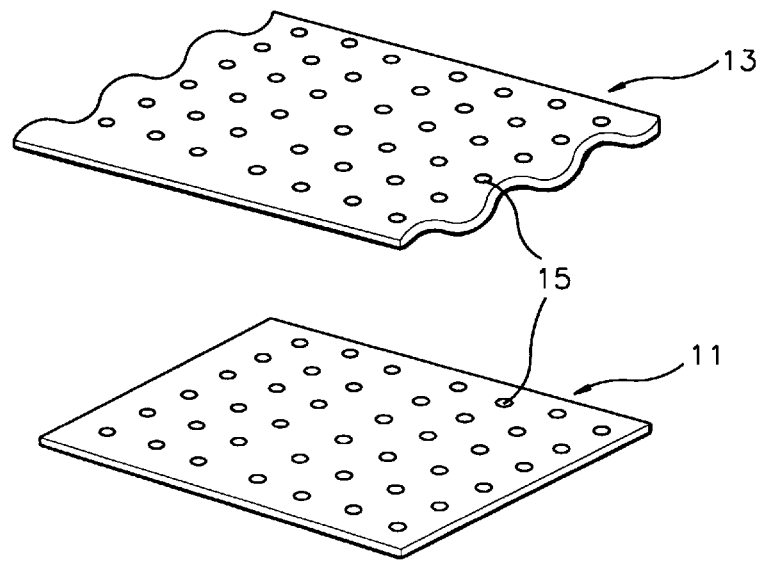
FIG. 3 is an enlarged perspective view of a flat substrate and a corrugated substrate constructing the catalyst of the present invention.
Figure 4:
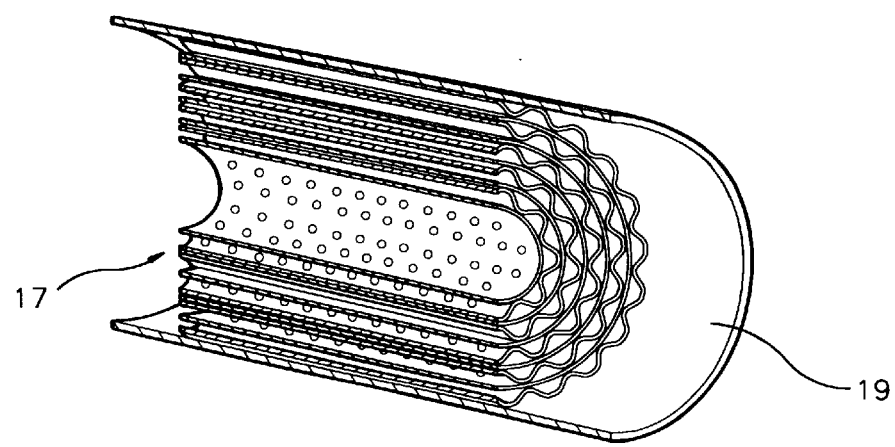
FIG. 4 is a side sectional view showing a attaching structure of the flat substrate and the corrugated substrate according to the present invention.

In FIGS. 3 and 4, a metallic flat substrate 11 and a metallic corrugated substrate 13 of heat-resistant, both composed of corrosion-resistant stainless steel, are shown.

The metallic flat substrate 11 and corrugated substrate 13 are made from a thin plate with a thickness of 50–70 $\mu$m, and a plurality of holes 15 perforated therein. The size and number of the holes 15, however, can be varied and is not be confined the above. According to the result measured through several experiments by the Applicant of the present invention, the holes 15 diameter is preferably formed to a size (about 25–35 μm) less than half the thickness of the flat substrate 11 and corrugated substrate 13 wherein the interval between adjacent holes is about 1 mm. As explained above, the substrate of the present invention is constructed in such a manner that the flat substrate 11 and corrugated substrate 13 are adhered to each other and rolled in a scroll form.

Figure 5:
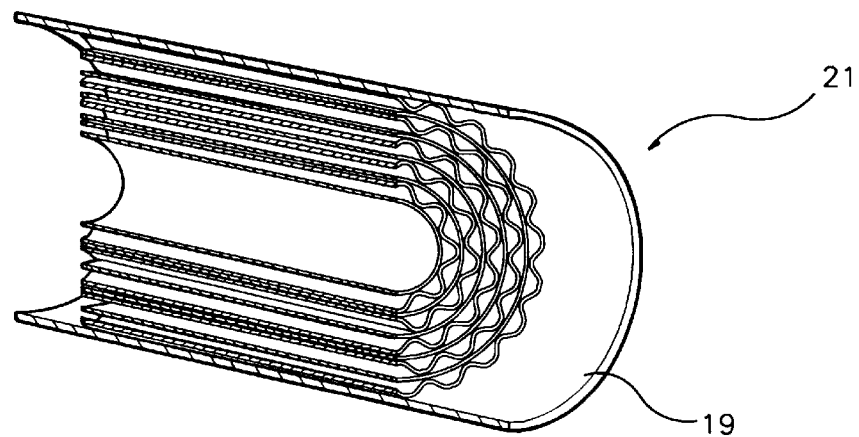
FIG. 5 is a side sectional view showing a state in which an intermediate layer and a catalytic layer are coated on the flat substrate and the corrugated substrate of FIG. 4.

Reference numeral 19 indicates a metallic housing forming the exterior of the catalytic converter. An intermediate layer of ceramic is formed on the surfaces of the flat substrate 11 and the corrugated substrate 13 on both sides, so that the holes 15 formed in each substrate 11, 13 are filled up and no longer visible as shown in FIG. 5. An actual catalytic layer is then formed on top of the intermediate layer. Through this process, the catalytic converter 21 of the present invention is completed.

Figure 6:
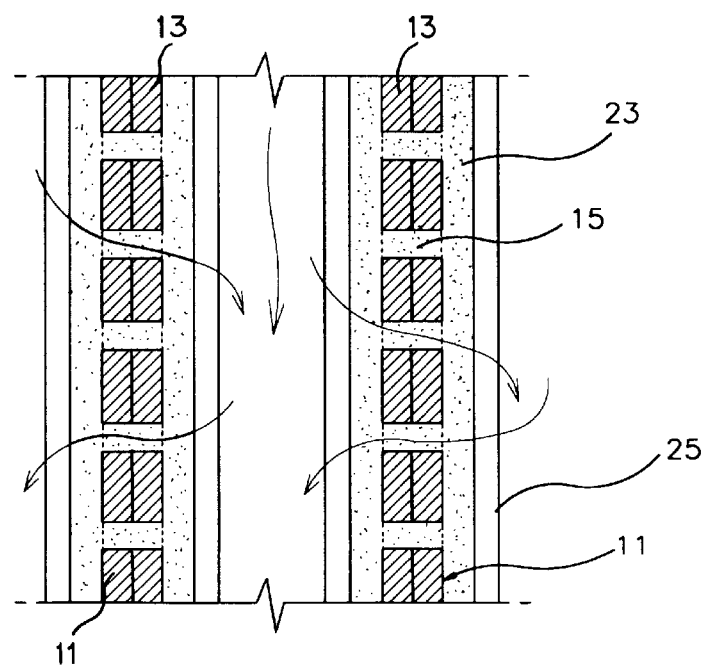
FIG. 6 shows an operation of the present invention.

FIG. 6 is an enlarged view of a state in which an intermediate layer and a catalytic layer are stacked on the surface of the each metallic substrate 11, 13. A porous ceramic intermediate layer 23 formed on the surface of the each substrate 11, 13 is wash-coated to enlarge the effective area of the catalyst. In this case, the intermediate layer 23 is coated by a thickness of about 10–20 μm, packed through a hole of flat substrate 11 and corrugated substrate 13, so as to be directly connected with the intermediate layer of the opposite side. The thus coated intermediate layer 23 is hardened in a baking step and is firmly adhered, physically and chemically, to each other. The catalytic layer 25 that purifies the exhaust gas is coated on the surface of intermediate layer 23. The catalytic layer 25 is formed of the same porous ceramic material as found in the intermediate layer 23, and of noble metals such as Pt and Ph, or Pd and Rh.

The operation of the catalyst according to the present embodiment will be described hereinafter. Because the porous ceramic material of the intermediate layer 23 and the catalytic layer 25 has a pore ratio of about 30%, the exhaust gas is allowed to pass through the each layer 23, 25. The exhaust gas passing through the cells formed between the metallic substrates 11, 13 moves and is diffused into adjacent cells through the holes 15 formed on the flat substrate 11 and corrugated substrate 13. Thus, the purification efficiency of poisonous gas is improved. As the intermediate layer 23 coated on the flat substrate 11 and corrugated substrate 13 is connected to both surfaces thereof through the hole 15, the separation occurring due to the difference of metallic materials is prevented.

The holes perforated on the flat substrate 11 and corrugated substrate 13 widen the effective area of the substrate 17, improving the purification efficiency of the exhaust gas.

In addition, the intermediate layer 23 coated on the surface of the each substrate 11, 13 serves to increase the surface area of the catalyst, but since the actual purifying operation of the exhaust gas is performed in the catalytic layer 25, the catalytic layer 25 can be directly coated on the each substrate 11, 13, eliminating the intermediate layer 23. In this case, the purification efficiency of poisonous gas can be increasingly improved, because the exhaust gas passing through the catalytic layer 25 is purified by the noble metals mixed in the catalytic layer 25, while the exhaust gas is moved and diffused into adjacent cells through the hole formed on the each substrate.

Through the embodiment explained above, as the catalyst for purifying the exhaust gas of the present invention improves problems of a ceramic substrate, with advantage of a conventional metallic substrate, so that a novel catalytic converter can be produced. That is, according to the present invention, the exhaust gas is moved and diffused into adjacent cells through the hole formed on the each substrate, with the effective area of the substrate being enlarged. Thus purification efficiency of poisonous gas is improved.

In addition, there is obtained the efficiency of improving endurance and impact resistance by increasing adhesion between the substrate and intermediate layer. Furthermore, the catalyst using the porous metallic substrate of the present invention has reduces back pressure and increases output to a greater extent than the catalyst using the conventional ceramic substrate. In addition, because of its high heat conductivity, the time needed to attain to the operation temperature is shortened, so that the operation time has a faster starting time, and the heat resistant and endurance becomes more efficient.

It will be apparent to those skilled in the art that various modifications and variations can be made in a porous metallic substrate of a catalytic converter for a vehicle of the present invention without departing from the spirit or scope of the invention. Thus, it is intended that the present invention cover the modifications and variations of this invention provided they come within the scope of the appended claims and their equivalents.

What is claimed is:

1. A catalyst for purifying the exhaust gas of vehicles comprising:

a metallic flat substrate formed in a scroll and having a surface;

a metallic corrugated substrate formed in a scroll and engaged with the flat substrate and having a surface;

an intermediate layer of ceramic provided on both surfaces of each of the flat substrate and the corrugated substrate and separating and connecting said substrates, and a catalytic layer provided on the intermediate layer, wherein the intermediate layer and the catalytic layer are porous thereby allowing exhaust gases to pass therethrough, wherein a first plurality of holes are formed over the entire surface of the corrugated substrate and a second plurality of holes are formed over the entire surface of the flat substrate, said first plurality of holes and said second plurality of holes being filled with the intermediate layer of ceramic so as to connect the intermediate layers respectively located on opposite surfaces of the same substrate to each other to prevent separation between the intermediate layers and associated substrate.

2. The catalyst for purifying the exhaust gas of vehicles as claimed in claim 1, wherein said metallic flat substrate and the corrugated substrate are formed of stainless steel.

3. The catalyst for purifying the exhaust gas of vehicles as claimed in claim 1, wherein the catalytic layer can be directly coated on the flat substrate and the corrugated substrate, eliminating the intermediate layer.

4. The catalyst for purifying the exhaust gas of vehicles as claimed in claim 1, wherein the intermediate layer and the catalytic layer have pore ratios of about 30%.

5. The catalyst for purifying the exhaust gas of vehicles as claimed in claim 1, wherein the first plurality of holes is aligned with the second plurality of holes.

6. The catalyst for purifying exhaust gas of vehicles as claimed in claim 1, further comprising an additional metallic flat substrate and an additional metallic corrugated substrate formed in a scroll.

7. The catalyst for purifying the exhaust gas of vehicles as claimed in claim 1, wherein said flat substrate and said corrugated substrates each have a thickness, said holes have a size of 25–35 mm which is less than half the thickness of either one of said flat substrate and said corrugated substrate and wherein the interval between holes is about 1 mm.

8. A catalyst for purifying the exhaust gas of vehicles, comprising:

a metallic flat substrate in a scroll form;

a metallic corrugated substrate formed in a scroll and engaged with the flat substrate; and a catalytic layer coated on the flat substrate and the corrugated substrate;

wherein a first plurality of holes are formed in the corrugated substrate and a second plurality of holes are formed in the flat substrate, said first plurality of holes and said second plurality of holes being filled with the catalytic layer so as to connect the catalytic layers respectively located on opposite surfaces of the same substrate to each other to prevent separation between the catalytic layers and associated substrate.

9. The catalyst for purifying the exhaust gas of vehicles as claimed in claim 8, wherein said metallic flat substrate and the corrugated substrate are formed of stainless steel.

10. The catalyst for purifying the exhaust gas of vehicles as claimed in claim 8, wherein the intermediate layer and the catalytic layer have pore ratios of about 30%.

11. The catalyst for purifying exhaust gas of vehicles as claimed in claim 8, wherein the first plurality of holes is aligned with the second plurality of holes.

12. The catalyst for purifying exhaust gas of vehicles as claimed in claim 8, further comprising an additional metallic flat substrate and an additional metallic corrugated substrate formed in a scroll.

13. The catalyst for purifying exhaust gas of vehicles as claimed in claim 9, wherein said flat substrate and said corrugated substrates each have a thickness, said holes have a size of 25–35 mm which is less than half the thickness of either one of said flat substrate and said corrugated substrate and wherein the interval between holes is about 1 mm.

* * * * *